Figure 1:
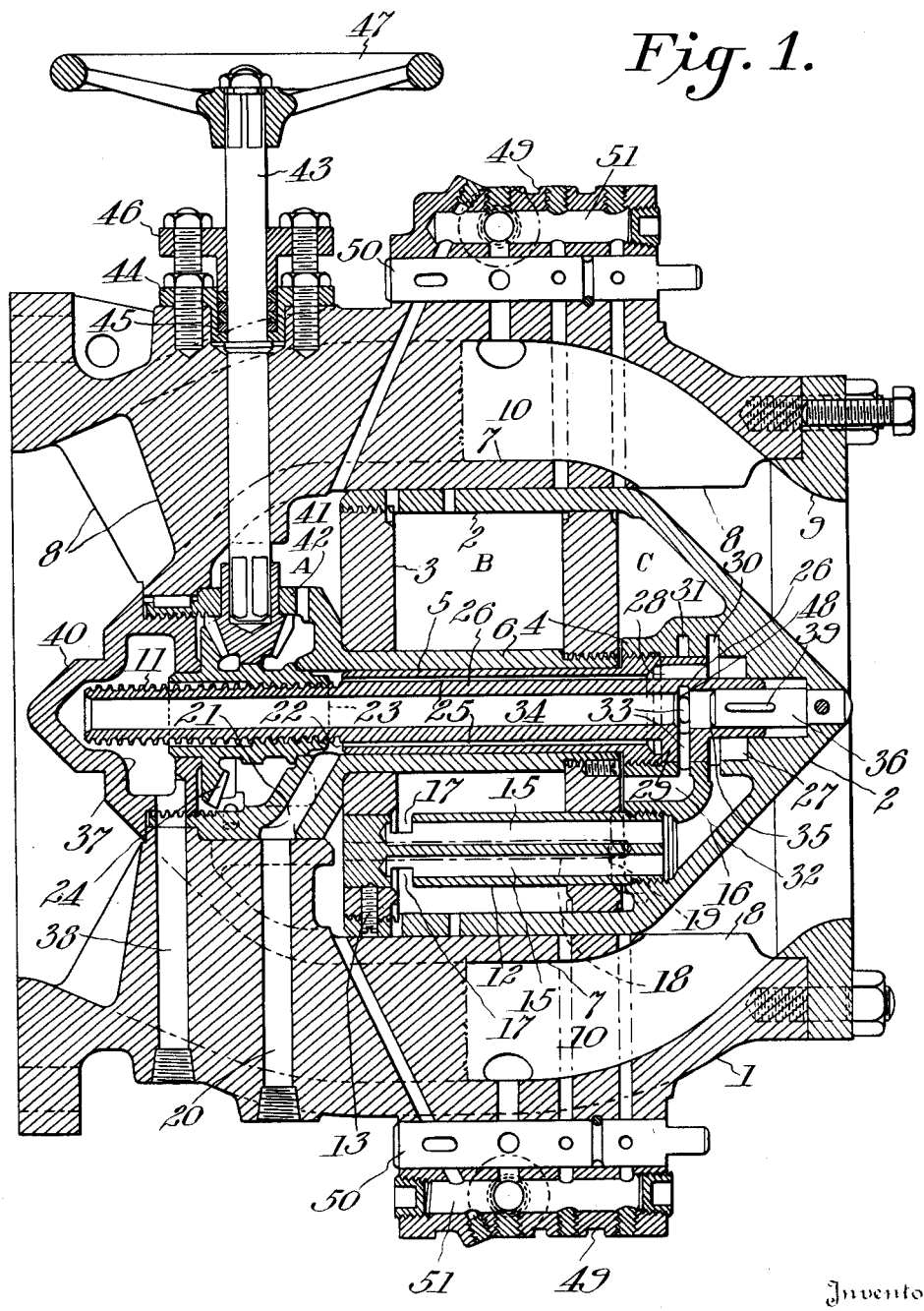

July 18, 1933.    P. A. KINZIE    1,919,112
HYDRO-MECHANICALLY CONTROLLED NEEDLE VALVE
Filed June 18, 1930    3 Sheets-Sheet 1

Inventor:
Phillip A. Kinzie,
By Byrnes Townsend & Potter,
Attorneys.

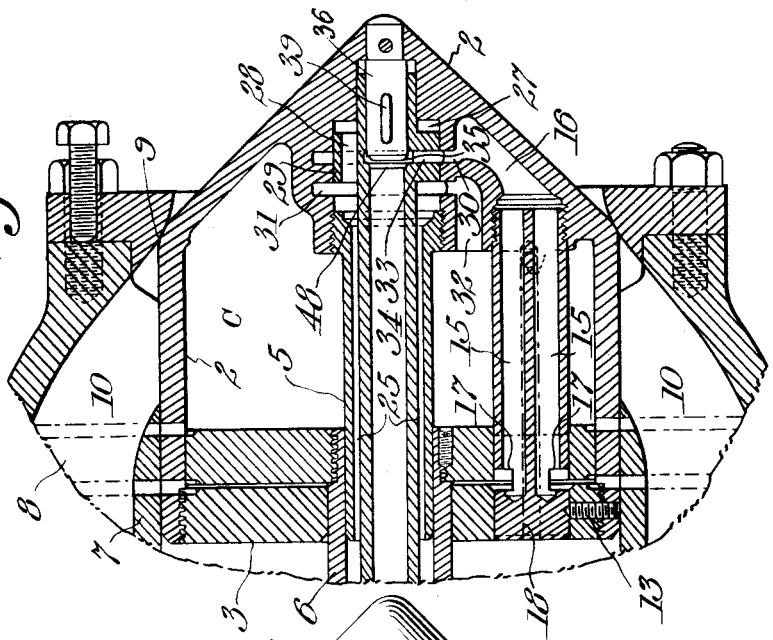

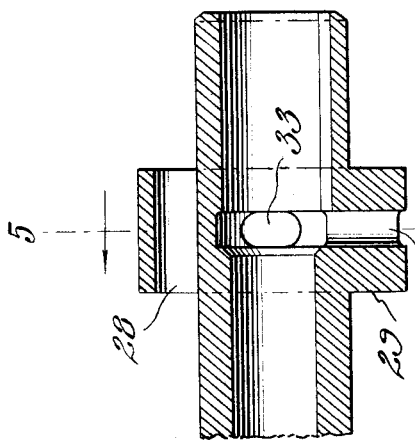
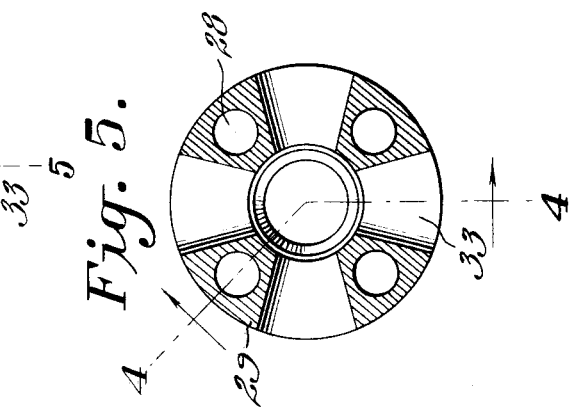
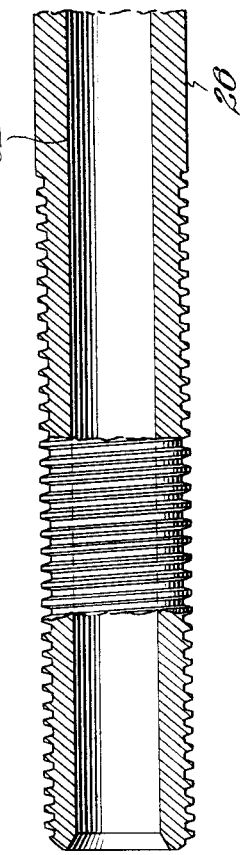
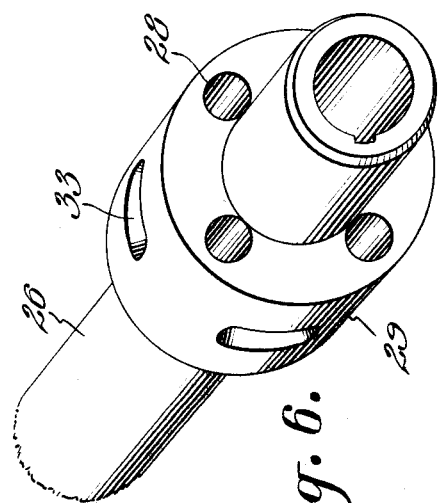

Patented July 18, 1933

1,919,112

UNITED STATES PATENT OFFICE

PHILLIP A. KINZIE, OF DENVER, COLORADO, ASSIGNOR TO UNIVERSAL HYDRAULIC CORPORATION, OF DENVER, COLORADO, A CORPORATION OF COLORADO

HYDRO-MECHANICALLY CONTROLLED NEEDLE VALVE

Application filed June 18, 1930. Serial No. 462,109.

This invention relates to fluid flow control valves, and particularly to needle valves of the type in which a pressure fluid is introduced into the valve casing for determining the action of the valve.

Within the past few years the tendency of modern engineering to utilize higher pressures in many lines of activity, particularly those relating to the generating of power by both steam and hydraulic means, and to the handling and controlling of fluids, has been more and more evident, while the agencies of control whereby these results have been attained have not been developed to a state of efficiency and economy of production commensurate with the increasing severity of operating characteristics which these increased pressures demand, and consequently the equipment for controlling the flow in these high pressure lines and systems is found to be merely adaptations of previous devices which, while fairly satisfactory under low pressures, are inherently of a nature that is ill suited to the increased pressures which must now be met.

As applied to large needle valves, for example to valves for controlling the flow of water in conduits having a diameter of the order of five feet, the generic methods of fluid flow control which I propose to employ are described in United States Patent No. 1,750,417, granted March 11, 1930 to McClellan et al., and in copending application, Ser. No. 333,459, filed January 18, 1929, by McClellan. The present invention relates to valves which are so constructed and controlled as to provide a practical and economic solution of the problem of adapting these general methods to the control of fluids under high pressure and in relatively small conduits, i. e. in conduits having diameters of an order substantially less than several feet. The invention will be described in connection with one particular construction which is well adapted for use in conduits of from about four to sixteen inches in diameter, and for controlling fluids under pressures of the order of a hundred pounds, but it will be apparent that the invention is not limited to these particular valves or range of valves.

Objects of the invention are to provide needle valve constructions of a size much smaller than has heretofore been found practical. A further object is to provide a fluid flow control valve including simple and reliable apparatus, under manual regulation, for distributing a pressure fluid to pressure chambers within the valve for determining the operation thereof. More specifically, an object is to provide a needle valve for use with relatively small conduits, and including within the valve casing a distributing valve for selectively delivering pressure fluid to and exhausting pressure fluid from a plurality of chambers, the relative pressures thereby established within the chambers determining the operating position of the valve.

These and other objects of the invention will be apparent from the following specification when taken with the accompanying drawings in which:

Fig. 1 is a longitudinal sectional view of one valve construction embodying the invention, Fig. 2 is a side elevation of the valve, portions of the elements for one typical installation being shown in association with the valve, Fig. 3 is a fragmentary longitudinal sectional view of the control tube and associated ports, the section being taken on the same plane as the corresponding portion of Fig. 1, but the control tube being shown at the opposite limit of its range of movement, Fig. 4 is a longitudinal section through the control tube on line 4—4 of Fig. 5, Fig. 5 is a transverse section through the control tube on line 5—5 of Fig. 4, and Fig. 6 is a perspective view of the forward end of the control tube.

Referring particularly to Figure 1 of the drawings, it will be seen that the valve proper is of the movable needle or plunger type, and that it together with its control mechanism comprises a unitary and self-contained assembly consisting essentially of a casing 1 and movable needle or plunger 2, comprising a cylindrical body with a conical nose pointing towards the outflow end of the valve, and having a disk-shaped head 3, threadably attached to its inflow or upstream facing end. The forward, conical nose-shaped portion of needle 2 contains and carries a double-ported boss 4 within which and by means of whose twin ports the pressure-producing fluid is introduced to and the exhaust fluid is carried away from the three hydraulic actuating chambers A, B and C of the valve, as will be presently described. Carried by and threadably attached to this boss is a rearwardly extending inlet tube 5 whose exterior cylindrical surface is slidably and closely fitted within the similarly bored interior of diaphragm tube 6, and its purpose will become apparent as the description continues.

As is the case in the valves disclosed in the patent and copending application referred to, the valve member or needle is mounted for axial sliding movement in the casing 1, within a cylindrical guide member or housing 7 supported axially of the casing 1 by radial vanes or ribs 8 which are preferably made integral therewith. Thus the needle can move toward or away from the seat 9 which is bolted to the casing 1, and by so doing control the flow of fluid through the annular space 10 defined by the enclosing walls of casing 1 and the exterior surface of the cylindrical guide member or housing 7 within which the needle is carried, thus defining the valve opening.

Obviously, as the needle 2 moves towards or away from seat 9, it carries with it head 3, inlet tube 5, and manifold tube 12 which is threadably attached to needle 2 at its forward end and locked into head 3 by screw 13 which also locks head 3 to the rear end of needle 2. This manifold tube 12 passes through and is slidably fitted within an aperture piercing the diaphragm 14 which is stationary, being threadably affixed to diaphragm tube 6. This manifold tube contains within it the twin drilled holes 15, whose forward open ends communicate with port 16 in the nose of needle 2 and whose rear ends communicate through milled slots 17 in tube 12 to the interior of chamber B. Tube 12 also contains the two drilled holes 18 extending from its rear end, where they open into chamber A, to near its forward end where two holes 19 drilled in 12 at right angles to its axis afforded communication to chamber C. From this it is evident that manifold tube 12 serves a dual purpose; namely, first, it provides means by drilled holes 15 and slots 17 whereby fluid may be supplied to or withdrawn from chamber B through port 16; second, it provides an intercommunicating and equalizing means whereby the pressures in chambers A and C are maintained equal at all times through the agency of the drilled holes 18 and 19, which at the same time afford communication between chambers A and C for interchange of fluid as conditions and movement of needle 2 may require. From this it is obvious that whatever the position of needle 2 may be, relative to its seat 9, that the above stated conditions of communication between chamber B and port 16, and also between chambers A and C will be maintained.

Having now described the means whereby fluidal communication to and from chambers A, B and C is established and maintained with reference to the nose of needle 2, the means for supplying pressure fluid to this region, the means of carrying away waste fluid therefrom and the means for securing both automatic and manual inter-relationship of these required functions in their proper sequence will in their turn be disclosed.

The pressure fluid for producing hydraulic reactions within the actuating chambers of the valve and thereby producing movement of the needle 2 axially with reference to its seat 9, or for maintaining it by hydraulic balance of pressures at any desired intermediate position relatively thereto, is introduced into the valve from an outside source of supply through the inlet passage 20 contained within casing 1. The inlet passage 20 extends upwards within casing 1 and at its upper limit communicates with the cored passage 21 contained in diaphragm tube 6, which extending upwards and towards the right, discharges into the axial bore of tube 6. The rear end of bore 22 is closed off by the forward facing hub end 23 of bevel gear 24 which is rotatably mounted therein. As the forward end of this bore is stopped off from communication with chamber C due to the presence of the closely fitting inlet tube 5, the pressure fluid is conveyed through the annular space 25 defined by the bore of the inlet tube 5 and the outer surface of control tube 26, and is carried forward along this annular passageway to the cylindrically bored valve chest 27 contained within the conical end portion of needle 2, where, by passing through the holes 28 in the slidably fitted and axially movable head portion 29 of control tube 26, it enters into the concentrically bored port 30, passes into port 16 and from thence into chamber B as already described to produce opening movement of the needle.

When the control tube 11 is in its rearward position as shown in Figure 1, the pressure fluid as above described is in communication with port 30, being cut off from port 31 by the head portion 29 of the control tube 26. Upon forward movement of the control tube 26, the head portion 29 moves to close the port 30 and open the port 31 to the pressure fluid. The port 31 is in communication with chamber C through the cored passage 32, so that the pressure fluid then enters chamber C and, through the equalizing passages in manifold tube 12 already described, enters chamber A as well, and in so doing produces closing movement of the needle 2.

In the opening or closing movement of the needle as hereinbefore described, it is obvious that the inactive chamber or chambers of the valve, as the case may be, must discharge the waste fluid displaced by movement of the needle, which is accomplished in the manner and through the means now about to be described. The head portion 29 of control tube 26 has radially drilled ports 33 midway of the axial length of this enlarged portion, whose inwardly converging ends communicate with the interior counterbore of tube 26, which counterbore in turn is in direct communication with the axial bore 34 extending throughout the entire length of this member. It will be seen that these radial ports 33 are shown registering with the port 31, which is in communication with chambers A and C through the ports which have already been described. Consequently, these chambers can now discharge any liquid displaced by rearward or opening movement of the needle, produced by pressure fluid entering chamber B through port 30 as hereinbefore described, through port 31 to ports 33 to axial port 34 in control tube 26. As the forward end of axial port 34 is closed off by the intruding rearward pointing end 35 of center plug 36, the waste fluid is caused to flow rearward through port 34 and to discharge therefrom into chamber 37, from whence it is carried downward and out from the valve casing 1 through the outlet or waste passage 38. Conversely, should the control tube be moved forward, a reversal of flow conditions would then be established, for pressure fluid would then be given access to port 31 and from thence to chambers A and C, producing closing movement of the needle 2 and the waste fluid displaced from chamber B would then discharge through port 30 through radial ports 33 to 34 and from thence to atmosphere as already described.

In the foregoing description the control tube has been described as having been or being moved with reference to the needle 2 and the casing 1. The means whereby the axial movement of said control tube is accomplished will now be described.

The control tube 26 is slidably carried at its forward end in the valve chest 27 as already described, and also upon the center plug 36 which is rigidly affixed to and carried by the nose of the needle 2. Center plug 36 carries an embedded key 39 which is received by a keyway contained within the forward end of control tube 26, the said key serving to prevent any rotation of tube 26, but not restraining it from endwise or axial movement. The rearward portion of tube 26 is externally threaded for a portion of its length, and this threaded portion is received by and carried within the similarly threaded hub 23 of beveled gear 24. The forward end of hub 23 of this gear 24 is rotatably mounted within the axial bore of diaphragm tube 6, while the rearward end of said gear hub is similarly mounted and carried within the axial bore of tube cap 40. This construction allows the gear to be rotated, but restrains any appreciable endwise or axial movement of said gear. In consequence of the axial restrainment of said gear coupled with rotational restrainment of tube 26 by key 39, any rotation of gear 24 is reflected by corresponding axial movement of tube 26 in a forward or rearward direction according to whichever direction the gear 24 is rotated. Gear 24 is in mesh with and is driven by bevel pinion 41 whose upwardly extending hub is carried by and mounted within the enlarged rear end 42 of diaphragm tube 6. The upward facing hub end of beveled pinion 41 is broached out square to receive and be driven by the similarly squared lower end of shaft 43 which extends upwards therefrom through the thickened vane 8 of casing 1, through stuffing-box 44, packing 45, gland 46, to receive upon its upper squared end the square broached hub of handwheel 47. Rotation of this handwheel produces, through the medium of the mechanism described, a corresponding axial movement of control tube 26. By making the thread upon 26 and in the hub of 24 right hand or left hand as desired, clockwise rotation of 47 may be caused to produce either closing or opening (forward or rearward) movement of 26, but I preferably make clockwise movement of 47 produce closing (forward) movement of 26.

From the foregoing description and from consideration of the drawings it will be apparent that clockwise rotation of handwheel 47 will cause forward movement of control tube 26 relative to both needle 2 and valve casing 1, and that this forward movement of 26 will result in the head portion 29 of 26 closing off port 30 from communication with annular passage 25 and opening port 31 therewith, thereby introducing pressure fluid from 25 into 31, thence into chambers C and A and so producing a closing movement of needle 2. Also that a counterclockwise rotation of handwheel 47 will pull control tube 26 rearward and open port 30 to the pressure fluid from annular passage 25 and so permit its entrance into chamber B, and thereby produce opening movement of the needle 2. The exhaust or displaced fluid in both cases will at the same time be permitted to escape from the inactive chambers through the axial port 34 to the atmosphere as already described. Further consideration of the previous description and of the drawings will also show that whenever the rotation of handwheel 47 is discontinued further reflected movement of needle 2 responsive thereto will shortly cease also, and it will then come to rest in a new position where the relative amount of areas of port apertures 31 and 30 with reference to either port passages 25 and 34 or vice versa will be such as will establish and maintain a natural stabilization of pressures within the actuating chambers as will balance their reactions. The needle will then remain stationary in either the wide open, fully closed or any intermediate position between these limits as may be desired.

In apparatus of this character it is often either desirable or necessary to move the needle 2 when there is no fluid within the system to which the valve is connected, and when such conditions obtain, the valve of my invention may readily be so caused to function mechanically through rotation of handwheel 47. A clockwise rotation will force tube 26 forward until the beveled seat 48 at the forward end of port passage 34 comes against the similarly beveled rearward end seat face 35 of center plug 36. Further forward movement of 26 then causes needle 2 to be carried towards seat 9. By this means the needle may be manually forced tightly against seat 26 and left there in a locked condition. When this is done the beveled seat 48 within the forward end of port passage 34 in control tube 26, is then bearing tightly against 35 and is seatedly engaged thereon so that fluid coming through the radial ports 33 is sealed off from escaping to the atmosphere through port passage 35. This as a desirable feature in valves of this character, as it prevents a continuous leakage and discharge through outlet 38 when the valve is left closed against pressure for lengthy periods as is frequently required.

By rotating handwheel counterclockwise the needle 2 can be caused to recede from its seat 9 through the agency of the control tube 26 pulling against the forward shouldered end of inlet tube 5 which, being threadedly attached to needle 2, causes said needle to move rearward in an opening direction with it.

The general arrangement and construction used for mounting diaphragm 14 on diaphragm tube 6 and its assembly into casing 1, secured thereto by tube cap 40 is plainly shown in Figure 1 and the interrelationship of the several parts there shown constitutes a unique, economical and readily accessible assembly which is well adapted to the purpose intended.

In order that valves of the polychambered type may be operated with the most satisfactory results it is essential that the interior cavities be freed from air when in operation and that these cavities be also provided with adequate drainage facilities as well.

Integrally formed with the casing 1 are two auxiliary valve chests 49, one placed on the top of and the other on the under side of the casing. Rotatably mounted in these chests are plugs 50. It will be apparent that a rotation of 90° of plug 49 of the top auxiliary valve from the position shown in Figure 1, will permit any entrapped air to escape from chambers A, B, C and the fluid passage 10. Similarly by means of the lower auxiliary valve, fluid can be drained from the above mentioned cavities. It is to be understood of course, that the chambers B and C can be vented and drained only when the main valve is in closed position.

The air vent valve chest and the drain valve chest are each provided with a drilled hole in parallel with the valve plug, which forms a collecting manifold for protection of the operator when either venting or draining the valve, and at the same time affording means whereby any discharge from the vent system or drain system or both may be carried by piping to any suitable point of disposal should this be desired.

A valve such as described may be employed at any appropriate point in a conduit or, as shown in Fig. 2, as an outlet or drain valve for a conduit.

The rear flange 52 of the valve body 1 is bolted to the flanged end of a conduit 53 and the pressure fluid for operating the valve may be, and preferably is tapped from conduit 53 through a pipe line 54 that includes a valve 55 and strainer 56. Pipe line 54 is connected to the threaded inlet boss 20' of the pressure fluid passage 20, and an outlet pipe 57 is similarly connected to the threaded boss 38' of the waste passage 38. Because of the high pressures which may be encountered, an air vent pipe 58 is preferably connected to the upper or air drain valve chest 49, the end of the vent pipe being directed away from the operator. The lower or water valve chest 49 is connected to any appropriate discharge point.

From the description and the illustrations given herein it will be evident to those who are skilled in the art that the invention provides a simple and reliable means whereby valves of this type may be made in sizes much less than has heretofore been found practicable, thereby making them applicable to a multitude of uses where such apparatus can be employed to marked advantage.

Having now described and disclosed my invention, various changes and modifications are contemplated as being within the spirit of the invention and the scope of the following claims.

I claim:

1. A valve adapted to be operated by fluid pressure having in combination, flow controlling means, pressure chambers, a manifold tube within said flow controlling means and a distributing valve within said flow controlling means, said manifold tube arranged to conduct a fluid pressure medium from said distributing valve to the pressure chambers.

2. A valve adapted to be operated by fluid pressure having in combination, flow controlling means, pressure chambers, fluid pressure medium intake means within said flow controlling means, a distributing valve included in said intake means, to control the delivery of a fluid pressure medium to said pressure chambers, and a passage to conduct exhaust pressure fluid from said pressure chambers to the atmosphere.

3. A valve adapted to be operated by fluid pressure having in combination, flow controlling means, pressure chambers to control said fluid controlling means, a distributing valve to distribute a fluid pressure medium to said pressure chambers, a control tube for said distributing valve and connections such that when the fluid pressure medium is directed by said distributing valve to one of said pressure chambers, exhaust pressure fluid from another chamber is discharged by way of said control tube.

4. A device as set forth in claim 3, wherein two of the pressure chambers are connected by a manifold tube.

5. A valve adapted to be operated by fluid pressure having in combination, flow controlling means, pressure chambers to control said flow controlling means, a distributing valve, a manifold forming a portion of a continuous passage from the distributing valve to the pressure chambers, a control tube for the distributing valve, an inlet passage to conduct a fluid pressure medium to said distributing valve and connections to exhaust waste pressure fluid by way of said control tube.

6. In a needle valve, a casing, a needle, means cooperating with said needle to provide a chamber adapted to receive a pressure medium to control the position of said valve in said casing, and means for controlling the flow of the pressure medium to and from said chamber; said means comprising a valve controlling the communication between said chamber, and, respectively, a high and a low pressure conduit, an auxiliary valve in the low pressure fluid conduit, and control means for simultaneously adjusting both of said valves.

7. The invention as set forth in claim 6, wherein said control means closes said auxiliary valve to prevent the escape of pressure medium from said chamber when the needle is moved to closed position and said first valve is positioned to retain said needle in closed position.

8. In a needle valve, a casing and a needle, means cooperating with said needle to provide a plurality of chambers for receiving a pressure medium, a high and a low pressure conduit, and means for controlling communication between said pressure chambers and said conduits, said means comprising a valve controlling the flow of pressure medium between said chambers and said conduits, an auxiliary valve in one of said conduits, and a control means for simultaneously adjusting both of said valves.

9. The invention as set forth in claim 8, wherein each of said valves includes valve elements on the said needle, and cooperating valve elements on a member within said needle.

10. In combination with a valve adapted to be operated by fluid pressure, flow controlling means, pressure chambers, a distributing valve, a controlling tube for said distributing valve, said tube adapted to conduct exhaust pressure fluid, an auxiliary valve seat on one end of said tube and an auxiliary valve adapted to seat against said valve seat.

11. In combination with a valve adapted to be operated by fluid pressure, flow controlling means, pressure chambers and a distributing valve for said pressure chambers, said pressure chambers and said distributing valve being within said flow controlling means, means to exhaust waste pressure fluid, and means to prevent escape of pressure fluid when said flow controlling means is closed and said distributing valve is positioned to maintain the flow controlling means in said closed position.

12. The invention as defined in claim 11, including a control tube for said distributing valve adapted to carry the waste pressure fluid, and said means to prevent the escape of pressure fluid comprising a seat on said controlling tube and a relatively stationary valve on said flow controlling means.

13. In combination with a valve adapted to be operated by fluid pressure, flow controlling means, pressure chambers, fluid pressure medium intake means, a distributing valve included in said intake means to control the delivery of the fluid pressure medium to said pressure chambers, a controlling tube for said distributing valve, a gear on one end of said tube and manually operable means to actuate said gear.

14. In combination with a valve adapted to be operated by fluid pressure, flow controlling means, pressure chambers, a distributing valve for said pressure chambers, fluid pressure medium intake means, a controlling tube included in said intake means to control the delivery of the fluid pressure medium to said distributing valve, external threads on said tube, an internally threaded gear mounted on said threads and manually operable means to control said gear.

15. In a needle valve, the combination with a casing including a cylindrical needle seat, a needle slidable on said seat, and means defining a plurality of chambers for receiving pressure fluid to actuate said needle, of a pressure fluid and an exhaust fluid passage in said casing, and control means including a distributing valve included in said pressure fluid passage for establishing communication between said chambers and said passages.

16. In a needle valve, the combination with a casing, a needle slidable in said casing, and a chamber within said needle for receiving pressure fluid to move said needle in one direction, of a pressure fluid passage in said casing, a distributing valve comprising a portion of said pressure fluid passage, said distributing valve being movable longitudinally of said needle, and a port on said needle and controlled by said distributing valve for introducing pressure fluid into said chamber from said passage.

17. The invention as set forth in claim 16, wherein said needle includes a portion in the path of movement of said distributing valve, and continued movement of said distributing valve in the direction which results in opening of said port engages said distributing valve with said portion of said needle to move said valve mechanically in the desired direction in the event that the pressure within said chamber is not effective to move the same.

18. In a needle valve, the combination with a casing including a needle seat, a needle having a nose and a head, and a diaphragm within said needle and connected to said casing by a tube on which said needle head slides, whereby two pressure chambers are formed within said needle, of distributing valve means within said needle controlling the supply of pressure fluid to and the exhaust of waste fluid from said pressure chambers.

19. The invention as set forth in claim 18, wherein said distributing valve means includes a distributing valve movable longitudinally of said needle, and ports in said needle and communicating with said pressure chambers, the respective ports being so positioned with respect to movement of said distributing valve that movement thereof in a given direction supplies pressure fluid to the chamber in which increased pressure tends to move said needle in the same direction as that in which the distributing valve was moved.

20. In a needle valve, the combination with a casing including a needle seat, a needle, and means defining two chambers for receiving pressure fluid to actuate said needle, telescoping tubular elements on said casing and needle respectively, the tubular element of said needle having ports therein communicating with the respective pressure chambers, of pressure fluid and waste fluid passages in said casing, and a distributing valve cooperating with said ports to control communication between said chambers and passages.

21. The invention as set forth in claim 20 in combination with means on said needle closing said waste fluid passage when said needle is in fully closed position and said distributing valve is positioned to maintain such closed position of the needle.

22. In a needle valve, the combination with a casing having a needle seat, a needle, a diaphragm tube extending axially of said seat and supporting a diaphragm, and a needle head on said needle and cooperating with said diaphragm, needle and seat to provide a plurality of pressure chambers, of means defining pressure and exhaust fluid passages within said tube, ports in said needle head and opening into the respective chambers, a distributing valve controlling the communication between said passages and ports, and means operable from the exterior of said casing for adjusting said distributing valve.

23. In a needle valve, the combination with a casing including a cylindrical needle seat and a diaphragm tube extending axially thereof, a needle slidable in said seat and having a head slidable on said tube, whereby two pressure chambers are formed within said needle, of a second tube within and spaced from said diaphragm tube, thereby forming a pressure fluid passage and a waste fluid passage, and a distributing valve at the diaphragm end of said second tube and cooperating with ports in said needle to control the transfer of pressure fluid between said passages and said chambers.

24. In a needle valve of the combined manual and hydraulic control type, a casing having a needle seat, a needle having a hollow boss projecting axially from the interior of the nose thereof, ports in said boss, pressure chambers within said needle and communicating with the ports in said boss, a distributing valve within said boss, means exterior to said casing for moving said distributing valve longitudinally of said casing, and passages controlled by said distributing valve for supplying pressure fluid to and exhausting waste fluid from the ports of said boss.

25. A needle valve of the type including a casing, a needle, means cooperating with said casing and needle to provide a plurality of pressure chambers, a distributing valve movable longitudinally of said casing, and ports in said needle controlled by said distributing valve, characterized by the fact that the needle has an integral boss projecting rearwardly from the interior of the nose portion thereof, said boss having a counterbore for receiving said distributing valve, and circular ports are formed in the interior surface of the bore of said boss to provide communication between said chambers and said distributing valve.

26. A needle valve of the type including a casing having a cylindrical seat, a needle slidable on said seat, and means providing a plurality of pressure chambers for receiving pressure fluid for actuating said needle, characterized by the fact that ports are provided through the wall of said needle at the upper and lower portions thereof, cooperating ports are formed in said casing in position to communicate with said needle ports when said needle is closed, and valves are provided to control said ports in said casing.

27. The invention as set forth in claim 26, wherein a single manifold valve controls all of the upper casing ports and a second manifold valve controls all of the lower casing ports.

28. The invention as set forth in claim 26, wherein additional valve-controlled ports are provided in said casing for venting air from the fluid passage through the casing, and for draining fluid therefrom.

29. In a needle valve, the combination with a casing having a needle seat, a needle, a diaphragm within said needle, a diaphragm tube securing said diaphragm to said casing, and a head on said needle and cooperating with said diaphragm and tube to form two pressure chambers within said needle, means structurally independent of said tube providing a plurality of fluid passages within said tube, and valve means cooperating with said passages to determine the flow of a pressure fluid to and from the respective passages.

30. A needle valve as claimed in claim 29, wherein said passage forming means comprises a pair of coaxial tubular elements, the elements being spaced to leave an annular passage between the same, and the inner element being hollow to provide a second passage.

31. A needle valve as claimed in claim 29, wherein said passage forming means comprises a tubular element fixed to said needle and slidable with respect to said diaphragm tube, a second tubular element within and spaced from said first element to leave an annular passage between the same; the said valve means comprising a valve on one of said elements and cooperating ports on the other element.

32. A valve comprising a casing having a fluid conduit therethrough, a shell within the casing, a needle telescoping within said shell and adapted to engage a seat carried by said casing to close said fluid conduit, a diaphragm within said needle, a diaphragm tube supporting said diaphragm, an annular head on said needle and serving with said diaphragm to divide into three tandem compartments the space within said telescoping members constituted by said inner shell and needle, and means including said tube for supplying pressure fluid to and exhausting the same from the middle compartment and at least one of said end compartments, said means including a pressure fluid tube fixed to said needle and having a sliding fit in said diaphragm.

33. A valve as claimed in claim 32 wherein said pressure fluid tube opens into the middle compartment and into a fluid passage formed in the nose of said needle.

34. A valve as claimed in claim 32 wherein said pressure fluid tube comprises a manifold tube having one passage affording communication between the two end compartments and a second passage which opens into the middle compartment.

35. In a needle valve, a casing having inner and outer walls defining an annular fluid passage, a boss extending inwardly from the inflow end of said inner wall, a diaphragm tube extending into and having a radial shoulder seated against the outflow end of said boss, a cap on the inflow end of said tube for securing the same to said boss, a needle slidable in said inner wall and having a head slidable on said tube, and a diaphragm on said tube and cooperating with said needle to form two pressure chambers.

36. The invention as set forth in claim 35, wherein said cap is hollow and provides a compartment for pressure fluid, in combination with a control tube slidable in said diaphragm tube, and a distributing valve on said control tube for establishing communication between said compartment and said chambers.

37. In a needle valve of the multiple chamber type, a casing having an interior shell, said shell including a cylindrical open-ended section for receiving a needle and a contracted end having a bore therethrough, a diaphragm tube having one end seated in said bore, and a cap securing said tube to said shell and closing the bore therein.

38. The invention as set forth in claim 37, wherein said contracted end of the shell is of frustro-conical form, and the exterior surface of said cap is conical and forms a continuation of the adjacent surface of the shell.

39. In a needle valve, a casing having an interior shell, a diaphragm tube within the shell, means securing the tube to said shell, a diaphragm carried by said tube, a needle slidable within said shell and having a head, said head and diaphragm cooperating with said tube and needle to form two pressure chambers, means including a control tube within said diaphragm tube for supplying pressure fluid to and exhausting the same from said chambers, and manually operated means for adjusting said control tube, said manually operated means including a shaft extending to the exterior of the casing, a gear on said shaft and journaled on said diaphragm tube, and means actuated by said gear for moving said control tube.

40. A needle valve as set forth in claim 39, wherein said last means includes an exterior thread on said control tube, a threaded sleeve cooperating with the thread on said control tube, and a gear on said sleeve and meshing with said first gear.

41. In a needle valve, a casing having an interior shell, a needle slidable within said shell, a diaphragm within said needle, a diaphragm tube having a reduced diameter portion extending into said needle to support said diaphragm, said shell having a bore therethrough for receiving the other and enlarged diameter end of said tube, a cap securing said tube to said shell, a needle head slidable on the reduced portion of said tube, a threaded control member within said tube a threaded sleeve on said control tube, said diaphragm tube and cap providing bearings for said threaded sleeve, a gear on said sleeve, a gear meshing with said first gear and journaled on the enlarged portion of said diaphragm tube, and means extending outside said casing for actuating said second gear.

PHILLIP A. KINZIE.